United States Patent
Jain et al.

(10) Patent No.: US 12,456,043 B2
(45) Date of Patent: Oct. 28, 2025

(54) TWO-DIMENSIONAL MESH FOR COMPUTE-IN-MEMORY ACCELERATOR ARCHITECTURE

(71) Applicant: INTERNATIONAL BUSINESS MACHINES CORPORATION, Armonk, NY (US)

(72) Inventors: Shubham Jain, Elmsford, NY (US); HsinYu Tsai, San Jose, CA (US); Geoffrey Burr, Cupertino, CA (US); Milos Stanisavljevic, Adliswil (CH); Pritish Narayanan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 882 days.

(21) Appl. No.: 17/657,431

(22) Filed: Mar. 31, 2022

(65) Prior Publication Data

US 2023/0316060 A1    Oct. 5, 2023

(51) Int. Cl.
*G06N 3/065* (2023.01)
*G06F 9/30* (2018.01)
*G06F 9/38* (2018.01)

(52) U.S. Cl.
CPC ............ *G06N 3/065* (2023.01); *G06F 9/3001* (2013.01); *G06F 9/30036* (2013.01); *G06F 9/3877* (2013.01)

(58) Field of Classification Search
CPC ... G06N 3/065; G06F 9/3001; G06F 9/30036; G06F 9/3877
See application file for complete search history.

(56) References Cited

U.S. PATENT DOCUMENTS

| | | |
|---|---|---|
| 10,180,928 B2 | 1/2019 | Nurvitadhi |
| 10,515,046 B2 | 12/2019 | Fleming |
| 10,963,780 B2 | 3/2021 | Nowatzyk |
| 11,023,413 B2 | 6/2021 | Wilkinson |

(Continued)

FOREIGN PATENT DOCUMENTS

TW    202143067 A    11/2021

OTHER PUBLICATIONS

Ghosal et al., "L2STAR: A Star Type Level-2 2D Mesh Architecture For NoC", Proceedings of the 2012 Asia Pacific Conference on Postgraduate Research in Microelectronics & Electronics (PRIMEASIA), Dec. 5-7, 2012, Hyderabad, India, pp. 155-159.

Lin et al., "A Dense Tensor Accelertaor With Data Exchange Mesh For DNN And Vision Workloads", Proceedings of the IEEE International Symposium on Circuits and Systems (ISCAS), Virtually Held, May 22-28, 2021, pp. 1-5.

(Continued)

*Primary Examiner* — David E Choi
(74) *Attorney, Agent, or Firm* — Gavin Giraud

(57) ABSTRACT

Embodiments disclosed herein include a compute in-memory (CIM) accelerator architecture for deep neural network (DNN). The CIM accelerator architecture may include a first analog fabric engine having a plurality of compute in-memory (CIM) analog tiles. Each CIM analog tile may be configured to store a matrix of weight operands producing a vector of outputs from a vector of inputs, and perform in-memory computations. The first analog fabric may also include a plurality of compute cores. Each CIM analog tile and each compute core may include a microcontroller configured to execute a set of instructions. The first analog fabric may also include on-chip interconnects communicatively connecting all CIM analog tiles in the plurality of CIM analog tile to the compute cores.

25 Claims, 5 Drawing Sheets

(56) References Cited

U.S. PATENT DOCUMENTS

| | | | |
|---|---|---|---|
| 11,049,586 B2 | 6/2021 | Parikh | |
| 11,221,827 B1 | 1/2022 | Hsu | |
| 11,610,104 B1* | 3/2023 | Far | G11C 7/16 |
| 2018/0246853 A1 | 8/2018 | Fowers | |
| 2018/0293698 A1 | 10/2018 | Venkatesh | |
| 2019/0042199 A1* | 2/2019 | Sumbul | G11C 8/10 |
| 2019/0065151 A1* | 2/2019 | Chen | G06F 17/16 |
| 2019/0102359 A1* | 4/2019 | Knag | G11C 11/418 |
| 2019/0138893 A1* | 5/2019 | Sharma | H10B 12/01 |
| 2020/0004690 A1 | 1/2020 | Mathew | |
| 2020/0026498 A1* | 1/2020 | Sumbul | G06F 12/0811 |
| 2020/0201652 A1 | 6/2020 | Alexander | |
| 2021/0073650 A1* | 3/2021 | Reisser | G06N 3/065 |
| 2021/0141571 A1 | 5/2021 | Lew | |
| 2021/0150328 A1* | 5/2021 | Dasalukunte | H04L 45/586 |
| 2021/0209286 A1 | 7/2021 | Drego | |
| 2021/0241820 A1* | 8/2021 | Biswas | G06G 7/16 |
| 2022/0012580 A1* | 1/2022 | Srivastava | G11C 11/412 |
| 2022/0012586 A1* | 1/2022 | Lin | G06N 5/04 |
| 2022/0076110 A1 | 3/2022 | Shao | |
| 2022/0351032 A1* | 11/2022 | Chou | G06N 3/0464 |
| 2022/0398036 A1* | 12/2022 | Sun | G06F 3/0616 |
| 2022/0398037 A1* | 12/2022 | Sun | G06F 3/0616 |
| 2022/0414443 A1* | 12/2022 | Li | G06F 7/5443 |
| 2023/0074229 A1 | 3/2023 | Jia | |

OTHER PUBLICATIONS

Truong et al., "RACER: Bit-Pipelined Processing Using Resistive Memory", Proceedings of the 54th IEEE/ACM International Symposium on Microarchitecture, Virtually Held, Oct. 18-22, 2021, pp. 100-116.

Xiao et al., "Processor Tile Shapes And Interconnect Topologies For Dense On-Chip Networks", IEEE Transactions on Very Large Scale Integration (VLSI) Systems, vol. 22, No. 6, Jun. 2014, 14 pages.

Xiao et al., "A Hexagonal Processor And Interconnect Topology For Many-Core Architecture With Dense On-Chip Networks", Proceedings of the 20th International Conference On Very Large Scale Integration—System-on-Chip (VLSI-SoC), Oct. 7, 2012, Santa Cruz, CA, pp. 125-143.

Garofalo, et al., "A Heterogeneous In-Memory Computing Cluster For Flexible End-to-End Inference of Real-World Deep Neural Networks", arXiv.2201.01089v1 [cs.AR], Jan. 4, 2022, pp. 1-15.

International Searching Authority, "Notification of Transmittal of the International Search Report and the Written Opinion of the International Searching Authority, or the Declaration", International application No. PCT/EP2023/056303, International Filing Date Mar. 13, 2023, Mailed on Jun. 16, 2023, 14 pages.

Jain, et al., "A Heterogeneous and Programmable Compute-In-Memory Accelerator Architecture for Analog-AI Using Dense 2-D Mesh", IEEE Transaction on Very Large Scale Integration (VLSI) Systems, vol. 31, No. 1, Jan. 2023, pp. 114-127.

\* cited by examiner

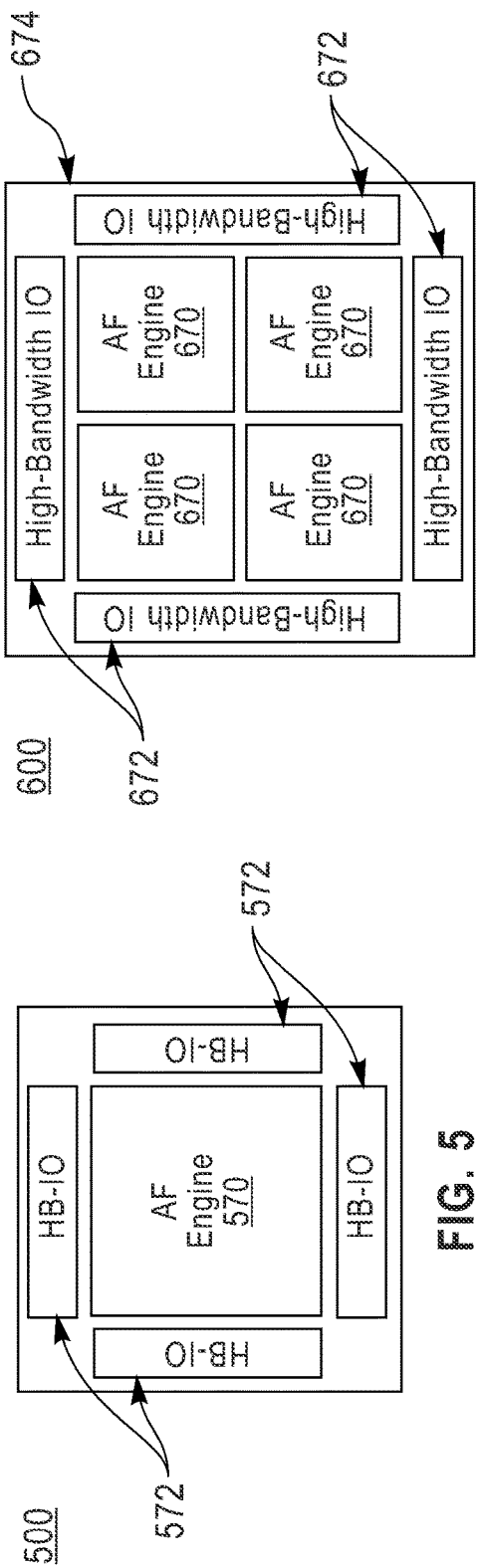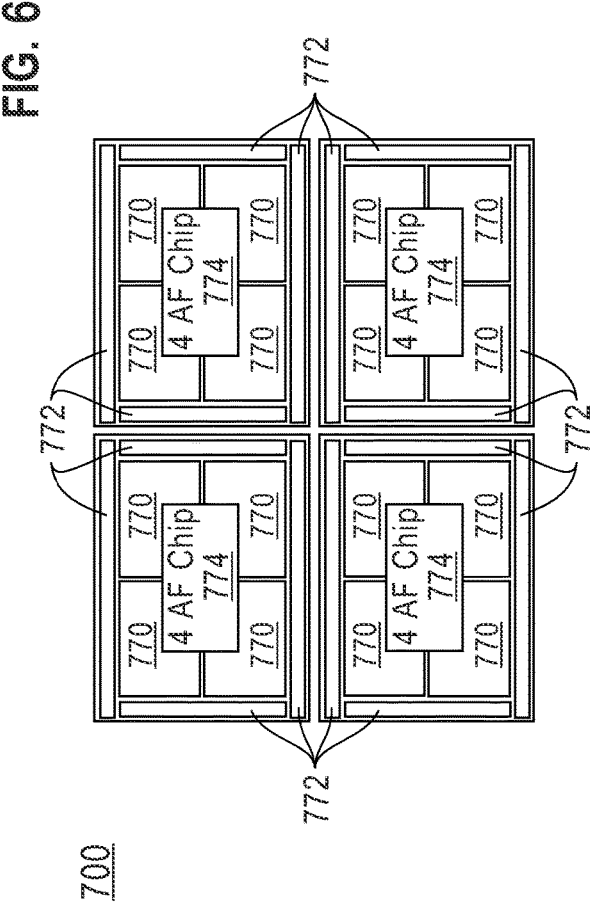

TWO-DIMENSIONAL MESH FOR COMPUTE-IN-MEMORY ACCELERATOR ARCHITECTURE

BACKGROUND

The present invention relates generally to fabricating deep neural network (DNN), and more particularly, to a compute-in-memory accelerator architecture for DNN.

Rapid improvements in AI hardware accelerators have been a hidden but pivotal driver of progress in Deep Neural Networks (DNNs). Better hardware enabled the training of very large networks with enormous datasets, as well as rapid inference of the resulting large and thus highly-capable DNN models. Current DNN hardware ranges from modern GPUs (Graphics Processing Units) with numerous features designed specifically for DNN training and inference, to specialized digital CMOS accelerators incorporating reduced precision, sparsity, dataflow architectures, hardware-software optimization, and very-large-area accelerator chips. In general, such accelerators must carefully orchestrate the flow of vast amounts of data between on-chip or off-chip volatile memories (SRAM and DRAM) and highly-specialized SIMD (Single Instruction Multiple Data) units. These units perform the multiply-accumulate instructions that dominate most DNN compute workloads. This dataflow not only encompasses the many neuron activations produced by each DNN layer, but also the DNN model-weights and partial-sums as well.

Recently, Compute-In-Memory (CIM) designs that can improve energy-efficiency (e.g., by performing the multiply-accumulate operations with time complexity within on-chip memory) do so by reducing the motion of DNN model-weights and partial-sums. By exploiting such weight-stationarity over a short timespan with volatile memories such as SRAM or DRAM or over longer timespans with slower and finite-endurance non-volatile memories (NVM) such as Flash, Resistive RAM (RRAM), Magnetic Random-Access Memory (MRAM), or Phase-Change Memory (PCM), CIM approaches can offer both high-speed and high energy-efficiency. These benefits can be seen across all DNN workloads, but are particularly pronounced for workloads that exhibit large fully-connected layers with low weight reuse. However, since most of these memories offer only binary or few-bit storage, spatial-multiplexing across multiple word- or bit-lines must be invoked to implement the multi-bit weights needed for state-of-the-art DNN performance. This trades off area and energy to achieve the necessary multiply-accumulate precision, typically paired with time-multiplexing on the word- or bitlines to support multi-bit activations.

Some emerging non-volatile memories, such as PCM and RRAM, exhibit a broad and continuous range of analog conductance states, offering a path towards high-density weight-storage. Such devices also introduce additional considerations, such as weight-programming errors, readout noise, and conductance drift. This Analog-AI paradigm, in which energy-efficient MAC operations are performed on area-efficient crossbar-array tiles of analog non-volatile memory, represents a particularly attractive form of Compute-In-Memory for hardware acceleration of DNN workloads.

While implementing a single- or few-tile demonstrator at the macro-level is relatively trivial, there are many challenges to implementing a full CIM accelerator system. First, while MAC operations easily dominate the compute requirements, there are many non-MAC operations that must be performed, embedded throughout every DNN workload. These tasks do not always map well to CIM tiles, and thus require conventional SIMD digital compute-cores. Multiple types of such compute-cores may be needed for the system to be efficient. For example, simple ReLU or scaling operations call for a much simpler compute-core than the complex matrix-matrix products of the Attention-compute in a Transformer network. Dedicated on-chip memory-cores are frequently needed to store intermediate signals in local scratchpad SRAM for use in later computations. This could be the previous tokens in a sentence, or the neighboring pixels in an image or intermediate image being processed. In addition to providing the right amount of on-chip scratchpad and the right number and mix of compute-cores, the spatial placement of the tiles, compute-cores and memory-cores must be carefully organized, and the inter-core and -tile data-transport must be fast and energy-efficient in order to minimize communication associated penalties. Despite the clear need for such a holistic system-level optimization as we have just described, most prior work has either focused on either component-level designs including novel materials, devices and circuits, in which case the novel crossbar tiles are simply bolted into a conventional digital accelerator architecture, or has focused on algorithmic advancements for making the application-level accuracy of Analog-AI systems functionally equivalent to their digital counterparts. Although many architectural challenges have been addressed by these efforts, several important design considerations were overlooked. Consequently, the gap between the reported peak performance and energy-efficiency for these architectures, and the actual sustained performance and energy-efficiency, can be drastic due to poor system-level utilization. These system-level inefficiencies found in prior work stem from an overemphasis on MAC operations, and from inadequate attention to the implementation of auxiliary operations, on-chip interconnect and data-transfer, and power management. Furthermore, earlier works intently focused on Convolutional Neural Networks (CNNs), and made little effort to support a broader class of important DNN workloads such as language and speech networks—workloads which also have been neglected by most conventional digital accelerator work.

SUMMARY

The present invention provides a microelectronic structure. The microelectronics structure may include a first compute in-memory (CIM) analog tile configured to store a matrix of weight operands that produce a vector of outputs from a vector of inputs. The first CIM analog tile may include a first microcontroller configured to execute instructions and perform in-memory operations. The microelectronics structure may include a first compute core communicatively coupled to the first CIM analog tile. The first compute core may include a second microcontroller configured to execute instructions. The microcontrollers provide a benefit of locally controlling operations so that each analog tile or each compute core may be run efficiently and have the shortest communication time between analog tile and compute core.

Embodiments of the present invention include a compute in-memory (CIM) accelerator architecture for deep neural network (DNN). The CIM accelerator architecture may include a first analog fabric engine. The first analog fabric engine may include a plurality of compute in-memory (CIM) analog tiles. Each CIM analog tile may be configured to store a matrix of weight operands producing a vector of outputs from a vector of inputs, and perform in-memory computations. The first analog fabric may also include a plurality of compute cores. Each CIM analog tile and each compute core comprises a microcontroller configured to execute a set of instructions. The first analog fabric may also include on-chip interconnects communicatively connecting all CIM analog tiles in the plurality of CIM analog tile to the compute cores.

Embodiments of the present invention include a heterogenous and programmable compute-in-memory (CIM) accelerator architecture that includes a plurality of compute in-memory (CIM) analog tiles configured to store a matrix of weight operands. Each CIM analog tile may be configured to store a matrix of weight operands producing a vector of outputs from a vector of inputs, and perform in-memory computations. The CIM accelerator architecture may include a first plurality of compute cores, wherein each compute core includes scratchpad memory configured to perform self-attention auxiliary operations. The CIM accelerator architecture may include a second plurality of compute cores configured to perform complex LSTM auxiliary (LSTM-aux) operations, and operations selected from the group consisting of: tan h, sigmoid, multiply, and Additions. The CIM accelerator architecture may also include a microcontroller embedded in at least one CIM analog tile in the first plurality of analog tiles, and at least one compute core in the second plurality of compute cores, and on-chip interconnects communicatively connecting all CIM analog tiles in the plurality of CIM analog tiles to the first plurality of compute cores and the second plurality of compute cores.

Embodiments of the present invention include a heterogenous and programmable compute-in-memory (CIM) accelerator architecture that includes a plurality of compute in-memory (CIM) analog tiles configured to store a matrix of weight operands. Each CIM analog tile may be configured to store a matrix of weight operands producing a vector of outputs from a vector of inputs, and perform in-memory computations. The CIM accelerator architecture may include a first plurality of compute cores, wherein each compute core includes scratchpad memory configured to perform self-attention auxiliary operations. The CIM accelerator architecture may include a second plurality of compute cores configured to perform complex LSTM auxiliary (LSTM-aux) operations, and operations selected from the group consisting of: tan h, sigmoid, multiply, and Additions. The CIM accelerator architecture may also include on-chip interconnects communicatively connecting all CIM analog tiles in the plurality of CIM analog tiles to the first plurality of compute cores and the second plurality of compute cores.

A more complete understanding of the present invention, as well as further features and advantages of the present invention, will be obtained by reference to the following detailed description and drawings.

BRIEF DESCRIPTION OF THE DRAWINGS

FIG. 5 depicts a schematic diagram of a CIM architecture having one analog fabric engine, in accordance with one embodiment of the present invention;

FIG. 6 depicts a schematic diagram of a CIM architecture having an analog fabric (AF) chip four analog fabric engines, in accordance with one embodiment of the present invention; and FIG. 7 depicts a schematic diagram of a CIM architecture having four AF chips each with four analog fabric engines, in accordance with one embodiment of the present invention.

DETAILED DESCRIPTION

Provided herein are heterogeneous and programmable compute-in-memory (CIM) accelerator architectures and microelectronic structures for deep neural network (DNN) inference. This architecture combines spatially-distributed CIM memory-array "Tiles" for weight-stationary, energy-efficient multiply-accumulate (MAC) operations, together with heterogeneous special-function "compute-cores" for auxiliary digital computation. Massively-parallel vectors of neuron-activation data are exchanged over short distances using a two-dimensional (2D) mesh, offering full end-to-end support for a wide range of DNN workloads, including convolutional neural networks (CNN), long-short-term memory (LSTM), and Transformers. Embodiments disclosed herein include designs for an "analog fabric" (i.e., a 2D grid of tiles and compute-cores interconnected by the 2D mesh) that address efficiency in both mapping of DNNs onto the hardware, and in pipelining of various DNN workloads across a range of mini-batch sizes. Embodiments may also include system-level assessments using projected component parameters for a realistic "Analog-AI" system, based on dense crossbar arrays of low-power nonvolatile analog memory elements, while incorporating a single common analog fabric design that can scale to large networks by introducing data-transport between multiple Analog-AI chips.

Figure 1:
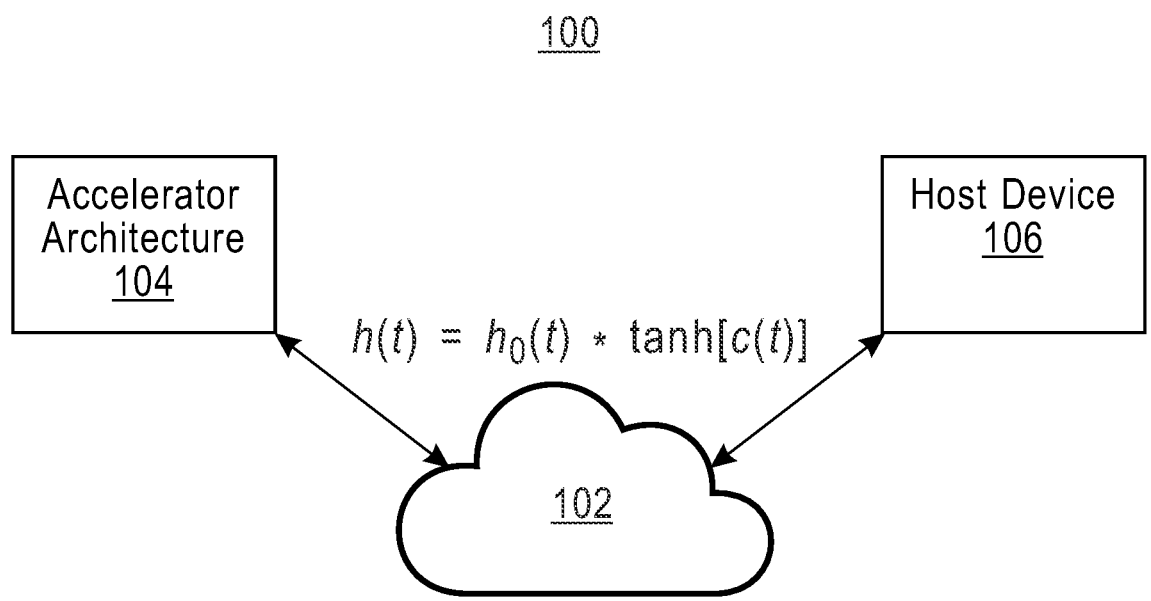
FIG. 1 depicts a functional block diagram illustrating a deep neural network (DNN) inferencing environment 100, in accordance with one embodiment of the present invention.

Turning now to the figures, FIG. 1 depicts a functional block diagram illustrating a deep neural network (DNN) inferencing environment 100, in accordance with one embodiment of the present invention. FIG. 1 provides only an illustration of one implementation and does not imply any limitations regarding the environments in which different embodiments may be implemented. Many modifications to the depicted environment may be made by those skilled in the art without departing from the scope of the invention as recited by the claims.

The DNN inferencing environment 100 includes an accelerator architecture 104 and a host device 106 connected over a network 102. The network 102 can be, for example, a telecommunications network, a local area network (LAN), a wide area network (WAN), such as the Internet, or a combination of the three, and can include wired, wireless, or fiber optic connections. The network 102 can include one or more wired and/or wireless networks that are capable of receiving and transmitting data, voice, and/or video signals, including multimedia signals that include voice, data, and video information. In general, the network 102 can be any combination of connections and protocols that will support communications between the accelerator architecture 104, the host device 106, and other computing devices (not shown) within the DNN inferencing environment 100. In various embodiments, the network 102 operates locally via wired, wireless, or optical connections and can be any combination of connections and protocols (e.g., personal area network (PAN), near field communication (NFC), laser, infrared, ultrasonic, etc.).

The host device 106 can be a standalone computing device, a management server, a web server, a mobile computing device, or any other electronic device or computing system capable of receiving, sending, and processing data. In other embodiments, the host device 106 can represent a server computing system utilizing multiple computers as a server system, such as in a cloud computing environment. In another embodiment, the host device 106 can be a laptop computer, a tablet computer, a netbook computer, a personal computer (PC), a desktop computer, a personal digital assistant (PDA), a smart phone, or any programmable electronic device capable of communicating with other computing devices (not shown) within the DNN inferencing environment 100 via the network 102. In another embodiment, the host device 106 represents a computing system utilizing connected computers and components (e.g., database server computers, application server computers, etc.) that act as a single pool of seamless resources when accessed within the DNN inferencing environment 100. In the depicted embodiment, the host device 106 includes a dataset 112 that may include raw stock price data or volume data of stocks collected from the data source 108. In other embodiments, the host device 106 may contain other applications, databases, programs, etc. which have not been depicted in the DNN inferencing environment 100.

Figure 2:
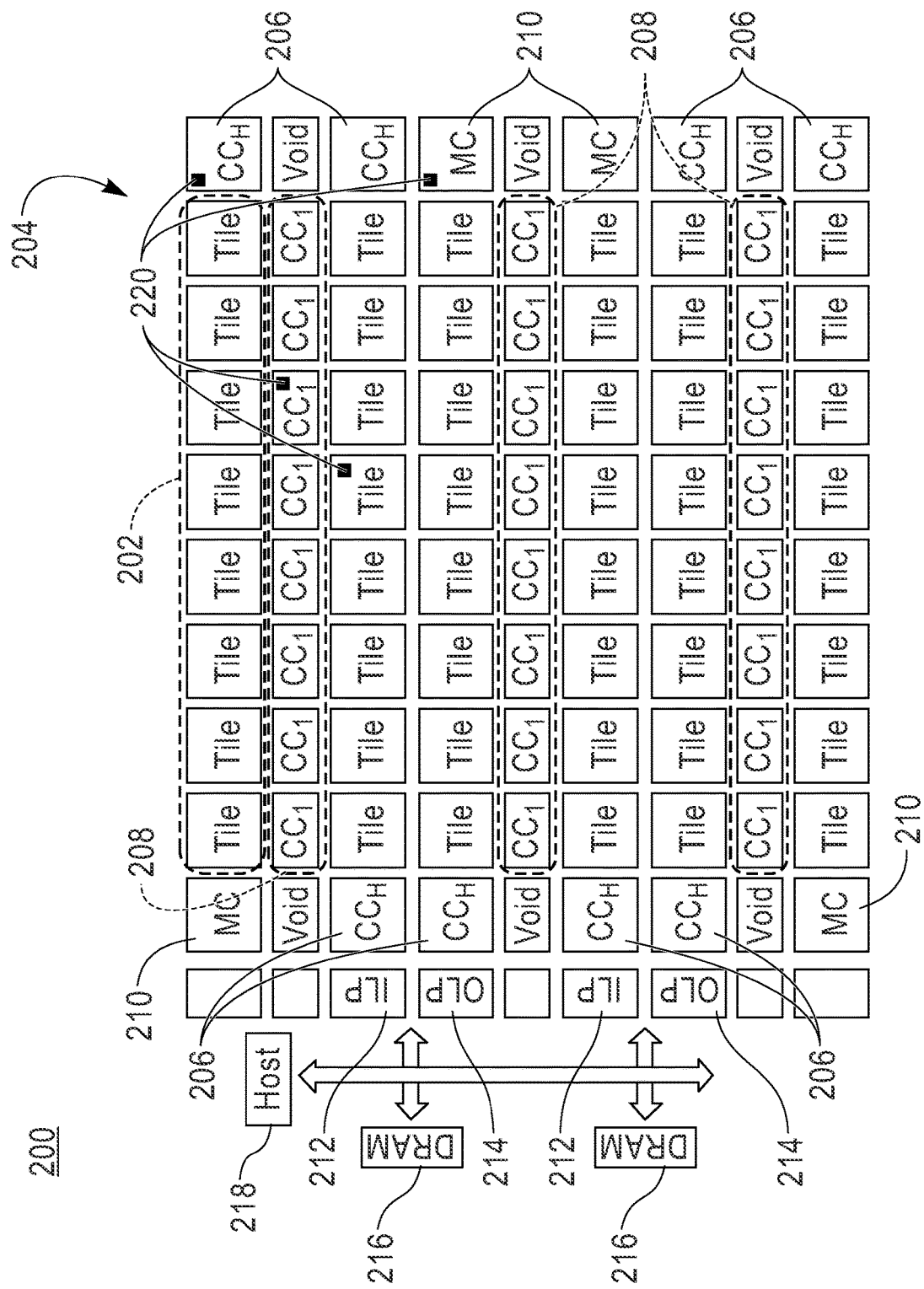
FIG. 2 depicts a schematic diagram illustrating an analog fabric 200 for use in a CIM accelerator architecture, in accordance with one embodiment of the present invention.

FIG. 2 depicts a schematic diagram illustrating an analog fabric 200 for use in a CIM accelerator architecture. The analog fabric 200 includes microelectronic structures that have unit cells such as CIM analog tiles 202 and compute cores 204 arranged in rows and columns. The analog tiles 202 and the compute cores 204 are heterogeneously distributed throughout the analog fabric 200 for increased communication speed and reduced energy usage in communications between the analog tiles 202 and the compute cores 204. The heterogeneous distribution includes the combination of various types of analog tiles 202 and compute cores 204 that may be fabricated with distinct properties for performing specific tasks that improve the overall efficiency and speed of the DNN inferencing environment 100. Each compute core 204 may be located between, and communicatively coupled to, analog tiles 202. each CIM analog tile and each compute core is communicatively connected to all immediately neighboring CIM analog tile or compute core. In certain embodiments, the compute cores 204 may be located between, and communicatively coupled to, other compute cores 204. Similarly, each analog tile 202 may be located between, and communicatively coupled to, analog tiles 202 and/or compute cores 204. In other words, each analog tile 202 and each compute core 204 may be communicatively connected to all immediately neighboring CIM analog tiles 202 or compute cores 204.

The analog tiles 202 are the primary multiply accumulate (MAC)-compute and weight storage units configured to store a matrix of weight operands for the DNN inference workload. Activations arrive as parallel bit-streams and are converted into analog pulse durations, enabling parallel excitation of an analog memory array embodied within the analog tiles 202. Multiply-accumulation is performed by the combination of Ohm's and Kirchhoff's Current Laws. The resulting raw summations are converted from analog current and integrated charge back into digital bit streams that can be sent out on a two-dimensional (2D) mesh that is described in detail below. Conversion is performed in parallel using Analog-to-Digital Converters (ADCs). Since DNN model operation weight operands stored on the analog tiles 202 are preprogrammed into the analog tiles 202 before inference begins, the input and output bit-precision of the analog tiles 202 must be chosen carefully. Excessive input precision leads to longer read time and higher read energy. Excessive output precision requires higher resolution in the ADC, which incurs additional area and energy consumption. The precision required depends both on the accuracy requirements of the DNN workload, and on the non-idealities of both the unit-cells and peripheral circuits.

The analog tiles 202 may perform a variety of operations, with some analog tiles 202 being fabricated to perform certain operations more efficiently and others fabricated to perform other operations more efficiently. For example, operations may include the analog MAC operations that can be readily executed on analog crossbars.

The operations performed by the analog fabric 200 may also include auxiliary operations that cannot be readily executed on analog crossbars (e.g., ReLU, Tan h, softmax). For these operations, the analog fabric 200 includes the compute cores 204, and maps all auxiliary operations onto the digital compute-cores containing specialized units to support these computations. These operations may include one or more of: Batch-Normalization, ReLU, GeLU, element-wise add, element-wise multiply, average-pooling, maxpooling, layer-normalization, activation function via look-up-table, LSTM-aux, tan h, sigmoid, softmax, and self-attention.

For LSTM-aux, the following computations generate the next hidden (h) and cell (c) states from the MAC outputs:

$$h_{i,o,f}(t)=x(t)+\sigma[U_{i,o,f}*x(t)+U_{i,o,f}*h(t-1)+b_{i,o,f}]$$

$$h_c(t)=\tan h[w_c*x(t)+U_c*h(t-1)+b_c]$$

$$c(t)=h_f(t)\cdot*c(t-1)+h_i(t)\cdot*h_c(t)$$

$$h(t)=h_0(t)\cdot*\tan h[c(t)]$$

where W, U, and b represent DNN weight-matrices storing weight operands.

For self-attention, the embedding activations are usually divided into multiple heads with vector size of 64. For each set of attention heads, containing query (Q), key (K), and value (V) matrices, the following computation is required:

$$\text{Attention}(Q,K,V)=\text{softmax}(QK^T/\text{sqrt}(d_k))V$$

where $d_k$ is the dimension of the key, which is typically 64. The illustrated embodiment of the analog fabric 200 includes three types of specialized compute cores to process these auxiliary operations. A "heavy" compute-core, $CC_H$ 206 includes dual-port SRAM for staging of activations for self-attention computation (Transformers), as well as aligner operations to reorganize staged-activations for weight-stationary convolution (CNNs). Outside the softmax, the $CC_H$ 206 uses 10-bit integer precision for the self-attention computations, sufficient for near-software-equivalent accuracy on BERT. A "light" Compute-core, $CC_L$ 208, is designed for lighter weight yet massively-parallel computations such as activation functions, fused LSTM-aux Ops, and LN computations. Memory cores, MC 210, resemble $CC_H$ 206 without the attention compute, with single-port SRAM for higher capacity in the same area footprint, to support CNNs and activation-staging for bidirectional LSTM networks.

These specialized compute cores 206, 208, 210 and their diverse compute operations make it possible to perform auxiliary operations close to where data is generated and later consumed by MAC operations in the analog tiles 202.

The compute cores 206, 208, 210 may differ based on specialization such as: precision, data format, dataflow, storage capacity, and programmability. The analog fabric 200 may also include input landing pads 212 and output landing pads 214 that communicate with DRAM 216 and may be configured to perform off-chip input-output (I/O) data transfer operations to eventually communicate to the host device 218.

The analog fabric 200 may also perform extra operations that are not a part of an original DNN graph. These extra operations are added to an analog-AI system to perform noise management and error compensation functions. As such, these operations cannot count towards performance metrics, and the energy and time spent performing them must be amortized by the high energy-efficiency and speed with which the "real" DNN operations are performed. Nevertheless, these extra operations help deliver the functional equivalence in DNN accuracy, and thus are supported by the analog fabric 200.

To support and organize each of the operations performed by the analog fabric 200, each of the tiles 202 and the cores 204 may include a microcontroller 220 that controls operations for the particular component (i.e., tile 202 or core 204). The analog fabric 200 of FIG. 2 only shows a microcontroller 220 for one each of the tiles 202, $CC_H$ 206, $CC_L$ 208, and MC 210. In certain embodiments, however, all of the tiles 202, $CC_H$ 206, $CC_L$ 208, and MC 210 of the analog fabric 200 may include a microcontroller 220. The microcontroller 220 controls operations for the specific tile 202 or core 204. For example, the tile 202 or core 204 may require scratchpad memory when the DNN workload calls for staging of activation data. In the analog fabric 200 of the illustrated embodiment, SRAMs are provisioned within each the microcontroller 220 of each $CC_H$ 206 and MC 210. The scratchpad needs per core are dictated by maximum sequence-length, image-resolution (input-size), and the ratio of the number-of-layers (network depth) to the number of supporting cores 204. To cover the most prevalent use-cases, the microcontrollers 220 may include SRAMs in each $CC_H$ 206 and MC 210 for full local support of sequence lengths of increased size and complexity. Longer sequences can be supported at some degradation in throughput-per-area or energy-efficiency, either by using multiple $CC_H$ 206 and MC 210 for each DNN layer, or by stashing data in off-chip main-memory.

The microcontrollers 220 may also execute a set of instructions, stored in a dedicated i-mem memory. Instructions and synchronization sequences are compiled during program preparation and then pre-loaded to the appropriate i-mems, together with DNN weight-programming for the new workload. During inference, each component (i.e., tile 202 or core 204) independently executes the specific set of instructions, mediated by periodic global synchronization, to ensure successful execution of the overall DNN workload. Control and synchronization are software-managed to minimize the additional hardware area-budget and power-budget.

Figure 3:
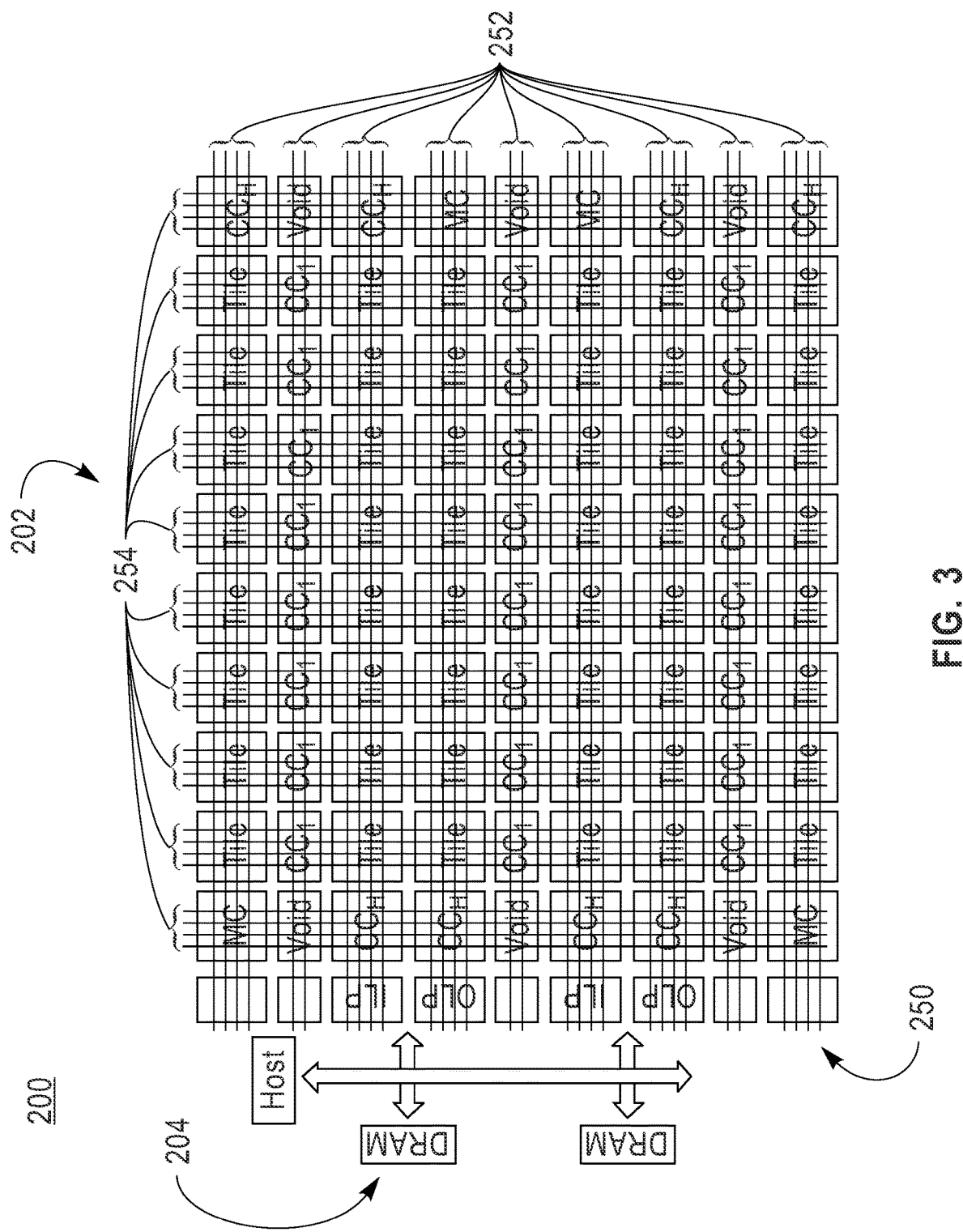
FIG. 3 depicts a two-dimensional (2D) mesh incorporated into the analog fabric of FIG. 2, in accordance with one embodiment of the present invention.

FIG. 3 depicts a two-dimensional (2D) mesh 250 incorporated into the analog fabric 200 of FIG. 2. The 2D Mesh 250 includes parallel metal row wires 252 and parallel metal column wires 254 formed into each CIM analog tile 202 and over the corresponding portion of each compute-core 204. While only a limited number of row wires 252 and column wires 254 are illustrated, each of the unit-cell rows and columns may be fabricated with two wires dedicated to it, allowing transport in either horizontal, vertical, or a plus-sign pattern (horizontal and vertical wire-pairs connected).

The compute cores 204 may be configured to simultaneously operate functions on neighboring analog tiles 202. The 2D mesh 250 may also enable multicast, where a subset of receivers can get the same data, simultaneously. That is, the 2D mesh enables multiple data-transfers involving multiple sender cores 204 or send tiles 202; and multiple cores 204 or receiver tiles, all participating simultaneously.

A spatial architecture will have many components which are active for only a portion of the total pipeline latency to provide power-saving functionality to perform at least one of the operations selected from the group consisting of: coarse-grained clock gating, fine-grained clock-gating, coarse-grained power-gating, fine-grained power-gating. There may also be many unmapped components that are completely idle throughout a given DNN workload. In this context, appropriate power-gating is a critical aspect of achieving high energy-efficiency. The analog fabric 200 may, therefore include a variety of power-gating and clock-gating options. The baseline option, for comparison purposes, is no power-gating, in which all components continuously consume energy throughout the entire workload, based on that component's idle-power specification. A second option is coarse-grained power-gating, in which components are powered down and/or clock-gated if they remain unmapped throughout the entire workload. Coarse-grained power-gating also includes partial-tile power-gating and clock-gating based on tile 202 segment utilization, with fully-unmapped segments being clock-gated and their associated peripheral-circuitry powered down, but partially-utilized segments consuming their full idle power. A third option is fine-grained power-gating. Fine-grained power-gating includes all the features of coarse-grained power-gating for turning off unmapped cores 204, tiles 202, and tile-segments, and additionally each component is clock-gated and power-gated outside of the time when the component is first and last used during the overall workload-execution time.

In certain embodiments, the analog tiles 202 may include unit-cells arranged in 512 rows and 512 columns. Each 512×512 analog tile 202 is hierarchically designed with eight rows and eight columns of segments, each containing 64×64 unit-cells. Each segment row and column can be independently power-gated and clock-gated, defined herein as coarse-grained power-gating, and this helps to mitigate efficiency loss due to poor mapping efficiency.

Figure 4:
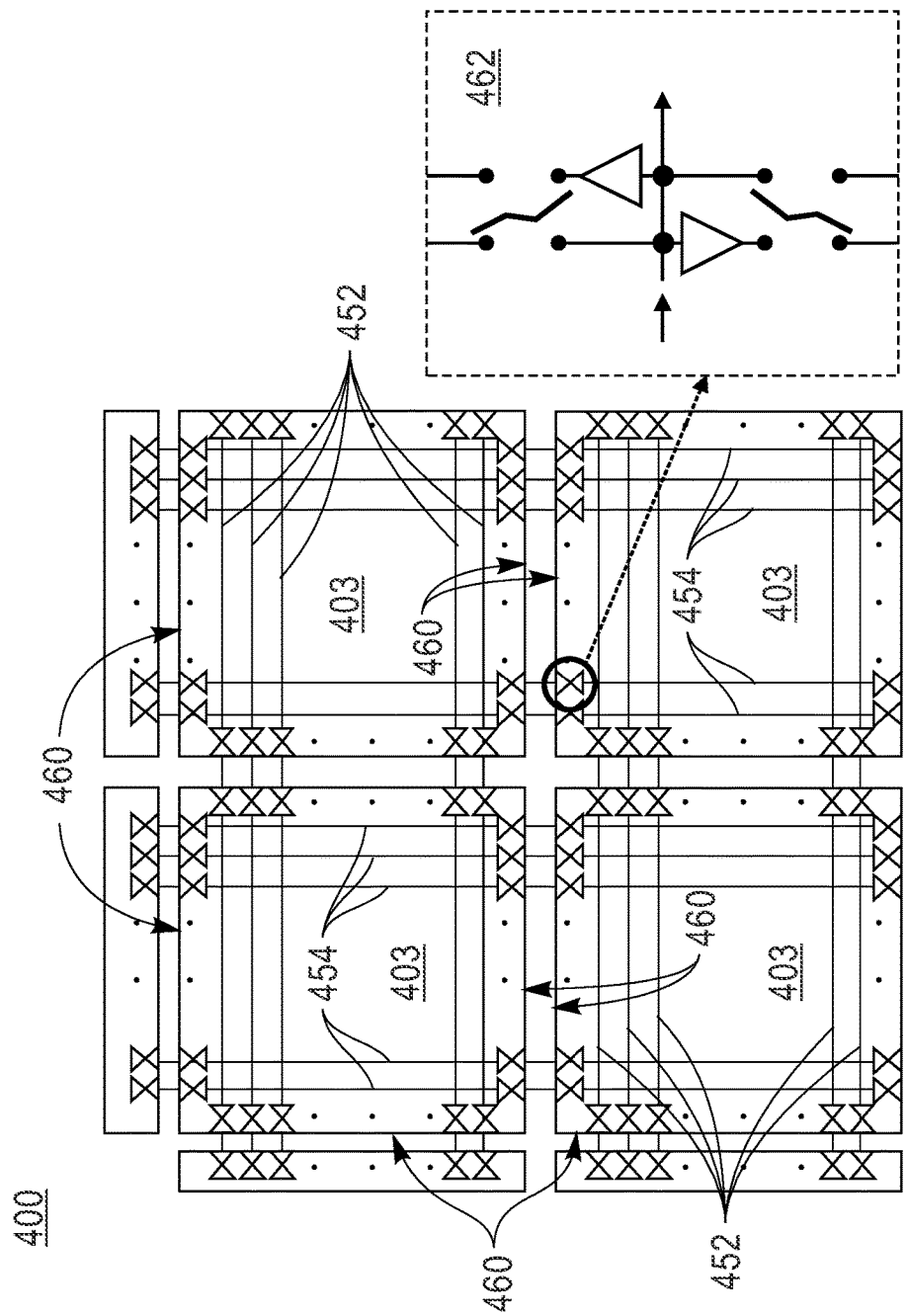
FIG. 4 depicts a schematic view of a 2D mesh, in accordance with one embodiment of the present invention.

FIG. 4 depicts a schematic view of a 2D mesh 400, in accordance with one embodiment of the present invention. The 2D mesh 400 is formed over component blocks 403 that may be any of the tiles (e.g., tiles 202) or cores (e.g., cores 204) described above. The 2D mesh 400 includes parallel metal row wires 452 and parallel metal column wires 454, in a similar manner to the 2D mesh 250 also described above. The 2D mesh 400 in FIG. 4, however, also illustrates boundaries 460 between the component blocks 403. On all four boundaries 460 of each component block 403, the 2D mesh 400 includes border-guard circuits (BGs) 462 that control data transport. The BGs 462 include signal buffers and pass-gates that are configured by a vectors of digital bits, stored in the local microcontroller (e.g., microcontrollers 220 of FIG. 2) of each component block 403, to establish the circuit-switched communication paths before components blocks 403 broadcast data to one or more destination component blocks 403.

Each BG 462 can configure each segment of its mesh wiring (e.g., row wire 452 or column wire 454) independently. Thus efficient manipulation operations useful within DNN workloads can be performed on data vectors during transfer, including concatenation, split, gather, and all-gather. For example, in LSTM networks with hidden-size of 512, a common use-case is the concatenation of four vectors, each of length 128 spanning two segments, as produced by four neighboring $CC_L$ cores. This concatenation can be efficiently performed with one parallel 2D mesh operation. In order to overlap data communication and compute, send and receive circuits are each equipped with two sets of data-registers. This allows tightening of the scheduling without creating pipeline-stalls, since the 2D mesh can transmit data and consume data internally inside the component block 403 (e.g., individual core 204 or tile 202) at the same time.

FIG. 5 depicts a schematic diagram of a CIM architecture 500 having one analog fabric engine 570, in accordance with one embodiment of the present invention. The analog fabric engine 570 may include a plurality of CIM analog tiles formed into a two-dimensional (2D) mesh and a plurality of compute cores connected to the 2D mesh. For simplicity in explanation, the tiles and cores are not illustrated specifically in FIG. 5. Each analog tile and each compute core may, however, by communicatively connected to all immediately neighboring CIM analog tile or compute core. The analog fabric engine 570 may be surrounded by a high-bandwidth chip-to-chip input/output 572. Furthermore, the high-bandwidth chip-to-chip input/output 570 may be separated and individualized for each boundary of the analog fabric engine 500.

FIG. 6 depicts a schematic diagram of a CIM architecture 600 having an analog fabric (AF) chip 674 four analog fabric engines 670, in accordance with one embodiment of the present invention. The four analog fabric engines 670 may include tiles and cores in a similar manner to the analog fabric engine 570 of FIG. 5. The analog fabric engines 670 of FIG. 6 may all be connected with a single 2D mesh. Furthermore, the analog fabric engines 670 of FIG. 6 may include a single high-bandwidth chip-to-chip input/output 672 around the periphery of all four analog fabric engines 670 rather than individually including a high-bandwidth chip-to-chip input/output for each analog fabric engine 670.

FIG. 7 depicts a schematic diagram of a CIM architecture 700 having four AF chips 774 each with four analog fabric engines 770, in accordance with one embodiment of the present invention. To scale up to larger workloads, multiple analog fabric engines 770 can be tiled together to implement a large weight-stationary system. Multiple AF chips 774 can be connected together, either by extending the 2D Mesh-wires on the same chip, or by introducing suitable chip-to-chip input/output to enable multi-chip-module systems. As Analog CIM and CMOS technology continues to scale to higher areal-densities, the footprint of each AF chip 774 can be expected to shrink. This will lead to more AF Engines on one chip, minimizing cross-chip communication while providing enough Analog CIM Tiles (and supporting Cores) to store all DNN weight operands, yet allowing reuse of modular design constructs for easy scalability.

The embodiments disclosed above may be used to complete matrix-vector multiply (MVM) operations. For example, analog fabric may be used to complete long-short-term-memory (LSTM) workloads. An LSTM network consists of recurrently-connected memory blocks, each containing self-connected memory cells and three multiplicative gates (input, output, and forget) to control cell activation. The analog fabric microelectronic structures disclosed above may be given an input vector x(t) at time t, cell-state c(t) and hidden-state h(t) are updated from the previous timestep (t−1) through four sets of MAC operations with weight operands followed by auxiliary operations. In simple LSTM networks, the dimensions of the input vector (x), cell state (c), and hidden state (h) are all equal, typically ranging from 50 to 2000. Thus, a 1-layer LSTM network with input and hidden vectors of size 512 calls for 8 tiles of 512×512 unit-cells each. In each time step, input vector x(t) is first concatenated with hidden vector h(t−1) from the previous time step, before being sent to the tiles. Weight operands with the same input dimensions are mapped to horizontally neighboring tiles, to exploit multi-casting on the 2D Mesh. By mapping weight operands with the same output dimensions to vertically-neighboring tiles, output vectors from each column of tiles can, one by one, efficiently move to the $CC_L$ core in their column for element-wise additions and auxiliary operations. The analog fabric may further interleave the weights for the cell and gate MAC operations, so that each tiles+$CC_L$ column produces 128 elements of $h_f(t)$, $h_i(t)$, $h_o(t)$, and $h_c(t)$ each, allowing the $CC_L$ core to construct 128 elements of c(t) and h(t) using fused LSTM-aux Ops. The 4 sets of h(t) elements from 4 separate $CC_L$ cores are concatenated on the mesh to produce the full h(t) vector, and c(t) elements are kept locally at each individual $CC_L$ core for the next timestep. By distributing digital compute across multiple $CC_L$ cores, core latency, balance core, and tile workloads are reduced, and unnecessary Mesh contention is avoided. These throughput gains grow larger with larger networks and larger mini-batch-sizes.

The embodiments disclosed above may also be used to complete matrix-vector multiply (MVM) operations such as transformer workloads. Transformer workload layer consists of a self-attention block followed by two large fully-connected layers. The self-attention block includes in-projection MAC operations, to generate query (Q), key (K), and value (V) vectors of equal length for each token within the sequence, as well as out-projection MAC operations to prepare the Attention data for input. Given embedding sizes of the vectors of between 512 and 2048, the analog fabric in the disclosed embodiments map in-projection tiles horizontally to exploit multi-casting on the 2D mesh. The multi-head self-attention computations take place in the closest available $CC_H$, each processing a number of heads in parallel.

After this self-attention block, residual element-wise-add and LayerNorm (LN) operations are performed at a nearby $CC_L$ core, before broadcasting input activations to the other numerous tiles. The partial outputs from all tiles are collected to a final $CC_L$ core, where final residual-add and LN operations are performed. For larger Transformer models, the required number of tiles, $CC_H$, and $CC_L$ cores increases straightforwardly, based on the embedding size of the network.

Convolutional neural networks (CNNs) are activation-heavy networks comprising numerous banks of small weight-kernel filters. While weight- and activation-reuse is significant, it does vary across network depth as the few filters convolved across large images in initial layers give way to many filters and small intermediate images deeper into the network. In a weight-stationary environment, stored activations must be re-organized and sent out to access the same weight kernels in different patterns. This incurs significant SRAM access and requires careful memory-management for good energy-efficiency. Since latency for MAC operations is determined by the number of Analog CIM Tile reads required, not by the number of total Ops, weight-reuse can reduce the total number of tiles required but increases total latency. The embodiments disclosed herein focus on accurately accounting for the energy efficiency of CNNs and do not implement intentional weight copying in order to further optimize throughput.

Even within the same portion of a CNN layer (say, a residual-bottleneck block), weight-layer sizes and shapes can vary widely, leading to variations in the number of tiles needed. Moreover, with fine-grain pipelining of CNN activations, each CNN layer can begin processing as soon as enough outputs from the previous layer have been generated. Here each weight layer is organized horizontally across tiles as much as possible, to ensure a dedicated 2D mesh path to the corresponding core ($CC_H$ or MC) performing activation alignment.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A microelectronic structure, comprising:
a first compute in-memory (CIM) analog tile configured to store a matrix of weight operands that produce a vector of outputs from a vector of inputs, wherein the first CIM analog tile comprises a first microcontroller configured to execute instructions and perform in-memory operations; and
a first compute core communicatively coupled to the first CIM analog tile, wherein the first compute core comprises a second microcontroller configured to execute instructions.

2. The microelectronics structure of claim 1, wherein the first compute core comprises a scratchpad memory.

3. The microelectronics structure of claim 1, wherein the first compute core is configured to perform an operation selected from the group consisting of: Batch-Normalization, rectified linear activation function, gaussian error linear unit, element-wise add, element-wise multiply, average-pooling, maxpooling, layer-normalization, activation function via look-up-table, long short-term memory-aux, tan h, sigmoid, softmax, and self-attention.

4. The microelectronics structure of claim 1, wherein the first compute core comprises a power-saving functionality to perform at least one of the operations selected from the group consisting of: coarse-grained clock gating, fine-grained clock-gating, coarse-grained power-gating, fine-grained power-gating.

5. The microelectronics structure of claim 1, wherein the first compute core is configured to perform off-chip input-output (I/O) data transfer operations.

6. The microelectronics structure of claim 1, wherein the first CIM analog tile is configured to perform vector matrix multiplication (VMM) operations.

7. The microelectronics structure of claim 1, further comprising a second compute core communicatively coupled to the first CIM analog tile and the first compute core, wherein the second compute core comprises a third microcontroller configured to execute a set of instructions.

8. The microelectronics structure of claim 7, wherein the first compute core and the second compute core differ based on specialization selected from the group consisting of: precision, data format, dataflow, storage capacity, and programmability.

9. A compute in-memory (CIM) accelerator architecture for deep neural network (DNN), comprising:
   a first analog fabric engine, comprising:
      a plurality of compute in-memory (CIM) analog tiles, wherein each CIM analog tile is configured to store a matrix of weight operands producing a vector of outputs from a vector of inputs, and perform in-memory computations;
      a plurality of compute cores, wherein, each CIM analog tile and each compute core comprises a microcontroller configured to execute a set of instructions; and
      on-chip interconnects communicatively connecting all CIM analog tiles in the plurality of CIM analog tile to the compute cores.

10. The CIM accelerator architecture of claim 9, wherein the plurality of compute cores comprises:
   a first subset of compute cores comprising a first capacity of scratchpad memory; and
   a second subset of compute cores comprising a second capacity of scratchpad memory.

11. The CIM accelerator architecture of claim 9, wherein the plurality of compute cores comprises a subset of compute core configured to perform off-chip input-output (I/O) data transfer operations.

12. The CIM accelerator architecture of claim 9, wherein each compute core in the plurality of compute cores is configured to perform an operation selected from the group consisting of: Batch-Normalization, ReLU, GeLU, element-wise add, element-wise multiply, average- and maxpooling, layer-normalization, activation function via look-up-table, LSTM-aux, tan h, sigmoid, softmax, and self-attention.

13. The CIM accelerator architecture of claim 9, wherein each CIM analog tile and each compute core comprises a power-saving functionality to perform an operation selected from the group consisting of: coarse-grained clock gating, fine-grained clock-gating, coarse-grained power-gating, fine-grained power-gating.

14. The CIM accelerator architecture of claim 9, wherein a first compute core from the plurality of compute cores and a second compute core from the plurality of compute cores differ based on specialization selected from the group consisting of: precision, data format, dataflow, storage capacity, and programmability.

15. The CIM accelerator architecture of claim 9, further comprising:
   a first four-engine system, comprising:
      a second analog fabric engine;
      a third analog fabric engine; and
      a fourth analog fabric engine, wherein the second analog fabric engine, the third analog fabric engine, and the fourth analog fabric engine are communicatively connected with the first analog fabric engine by a 2D mesh, and the 2D mesh is surrounded by a high-bandwidth chip-to-chip input/output.

16. The CIM accelerator architecture of claim 15, further comprising:
   a second four-engine system;
   a third four-engine system; and
   a fourth four-engine system communicatively connected as a multi-chip system.

17. The CIM accelerator architecture of claim 9, wherein plurality CIM analog tile and compute cores are connected using a two-dimensional (2D) mesh comprising parallel row wires and parallel column wires that enables multicast between the plurality of CIM analog tiles and the plurality of compute cores.

18. The CIM accelerator architecture of claim 9, further comprising a border-guard circuit (BG) on each parallel row wire and each parallel column wire at each border of the plurality of CIM analog tiles and the plurality of compute cores.

19. The CIM accelerator architecture of claim 18, wherein the BGs comprise signal buffers and pass-gates that are controlled by a microcontroller on each compute core and CIM analog tiles.

20. A heterogenous and programmable compute-in-memory (CIM) accelerator architecture comprising:
   a plurality of compute in-memory (CIM) analog tiles configured to store a matrix of weight operands, wherein each CIM analog tile is configured to store a matrix of weight operands producing a vector of outputs from a vector of inputs, and perform in-memory computations;
   a first plurality of compute cores, wherein each compute core comprises a scratchpad memory configured to perform self-attention auxiliary operations;
   a second plurality of compute cores configured to perform complex LSTM auxiliary (LSTM-aux) operations;
   a microcontroller embedded in at least one CIM analog tile in the first plurality of analog tiles, and at least one compute core in the second plurality of compute cores; and
   on-chip interconnects communicatively connecting all CIM analog tiles in the plurality of CIM analog tiles to the first plurality of compute cores and the second plurality of compute cores.

21. The CIM accelerator architecture of claim 20, further comprising of a third plurality of compute cores can be configured to perform off-chip input-output (I/O) data transfer operations.

22. The CIM accelerator architecture of claim 20, further comprising of a third plurality of compute cores, wherein each compute core in the third plurality of compute cores comprises a power-saving functionality to perform at least one of the operations selected from the group consisting of: coarse-grained clock gating, fine-grained clock-gating, coarse-grained power-gating, fine-grained power-gating.

23. The CIM accelerator architecture of claim 20, wherein the first plurality of compute cores and second plurality of compute cores are configured to perform an operation selected from the group consisting of: Batch-Normalization, ReLU, GeLU, element-wise add, element-wise multiply, average- and maxpooling, layer-normalization, activation function via look-up-table, tan h, sigmoid, and LSTM-aux.

24. The CIM accelerator architecture of claim 20, further comprising a border-guard circuit (BG) on parallel row wires and parallel column wires of the on-chip interconnects between the first plurality of compute cores, the second plurality of compute cores, and the plurality of CIM analog tiles.

25. A heterogenous and programmable compute-in-memory (CIM) accelerator architecture comprising:
   a plurality of compute in-memory (CIM) analog tiles configured to store a matrix of weight operands, wherein each CIM analog tile is configured to store a matrix of weight operands producing a vector of outputs from a vector of inputs, and perform in-memory computations;

a first plurality of compute cores, wherein each compute core comprises of scratchpad memory configured to perform self-attention auxiliary operations;
a second plurality of compute cores configured to perform complex LSTM auxiliary (LSTM-aux) operations and operations selected from the group consisting of: tan h, sigmoid, multiply, and Additions; and
on-chip interconnects communicatively connecting all CIM analog tiles in the plurality of CIM analog tiles to the first plurality of compute cores and the second plurality of compute cores.

\* \* \* \* \*